May 31, 1966 E. C. HOPKINSON 3,254,218
PULSE PARALYSIS SYSTEM FOR SCINTILLATION DETECTORS
Filed Dec. 31, 1962 4 Sheets-Sheet 1

INVENTOR.
ERIC C. HOPKINSON
BY
E. F. Bard
ATTORNEY

May 31, 1966  E. C. HOPKINSON  3,254,218
PULSE PARALYSIS SYSTEM FOR SCINTILLATION DETECTORS
Filed Dec. 31, 1962  4 Sheets-Sheet 4

INVENTOR.
ERIC C. HOPKINSON
BY
E. F. Bard
ATTORNEY

United States Patent Office 3,254,218
Patented May 31, 1966

3,254,218
PULSE PARALYSIS SYSTEM FOR SCINTILLATION DETECTORS
Eric C. Hopkinson, Houston, Tex., assignor to Dresser Industries, Inc., Dallas, Tex., a corporation of Delaware
Filed Dec. 31, 1962, Ser. No. 248,568
4 Claims. (Cl. 250—71.5)

This invention relates to methods and apparatus for selectively activating a radiation detector, and more particularly relates to improved methods and apparatus for activating a scintillation counter employed in radioactivity well logging apparatus.

There are several different types of radiation detectors now in general use for purposes of detecting and measuring radiation in various environments. The types most often employed for well logging purposes include the Geiger-Mueller counter, the proportional counter, and the scintillation counter, depending upon the type of radiation measurement sought to be made. Each of these types of detectors are adapted to develop electric pulses in response to incident radiations of one or more predetermined types. Unfortunately for many purposes, none of these detectors can produce more than one such pulse at a time. Thus, if two or more such radiations strike the detector at substantially the same time, only one pulse will result. If the detector used is a Geiger-Mueller counter (or a similar type of apparatus), it is not ordinarily too serious that some of the incident radiations are lost from the measurement. However, detectors such as the scintillation counter provide pulses having amplitudes directly related in height to the energies of the incident radiations. If two or more radiations strike a scintillation counter phosphor at about the same time, only one pulse will be produced as hereinbefore explained, but the amplitude of that pulse will be proportional to the sum of the energies of the coincident radiations. Thus, the output pulse will be representative of a single radiation of much greater energy than that of any of the two or more coincident radiations contributing to the pulse.

A further limitation on the effective use of scintillation counters for well logging purposes is that pulses produced by a well logging detector must often be transmitted thousands of feet over a cable connecting the subsurface apparatus to the data processing and recording equipment located at the surface. Unfortunately, the resolving time of the detector is much better than that of the cable, and thus, if two or more incident radiations occur within the cable resolving time, only one electric pulse of distorted amplitude will reach the surface even though the detector may have in fact produced separate pulses.

Notwithstanding the fact that a radiation detector may be struck by a great many radiations during a very small increment of time, it is rare that two or more radiations strike at exactly the same moment. Thus, if the detector could be disabled, or "inactivated," for a period of time immediately following the arrival of the first radiation, the output pulse could be limited in amplitude to substantially that related to the first incident radiations. This period of disability would, of course, approximate the resolving time of the cable. If the detector pulse per se is not intended to be transmitted to the surface, then the period of disability would approximate the resolving time of the detector. Unfortunately, the magnitude of the resolving times of either the scintillation counter, or the cable, is only a matter of microseconds in duration. The crystal or phosphor, in a scintillation counter, cannot be effectively "disabled" in any practical manner save by shielding it from incident radiations, or by removing it from the environment wherein radiation is present. On the other hand, the photomultiplier tube can be turned off by disconnecting its power supply, but in such an event the recovery time of the tube and associated circuitry is much greater than that necessary or even desirable for the purposes hereinbefore described, and many incident radiations would be lost from the measurement sought to be made.

These disadvantages of the prior art are overcome with the present invention, and novel methods and apparatus are provided which render a scintillation counter responsive to the first of a plurality of incident radiations occurring within a very short period of time, and which disable the scintillation counter for a very short period of time following the occasion of such first radiation detected. In addition, the present invention provides novel methods and apparatus for rendering a scintillation counter responsive to incident radiations occurring during very short preselected periods of time, whereby a scintillation counter may be enabled and disabled at a very high frequency.

Accordingly, it is an object of the present invention to render a radiation detector responsive to incident radiation during a very short period of time.

It is also an object of the present invention to inactivate a radiation detector for a very short period of time.

It is a further object of the present invention to disable a scintillation counter from responding to incident radiations during a predetermined period, and to cause said scintillation counter to become immediately responsive to incident radiation upon the expiration of such predetermined period.

It is a specific object of the present invention to render a scintillation counter unresponsive to incident radiation by applying to said detector a potential of a polarity and magnitude sufficient to render a photomultiplier tube non-conductive of electrons.

It is another specific object of the present invention to render a scintillation counter unresponsive to incident radiation by means for developing a potential of a polarity and magnitude sufficient to render a photomultiplier tube non-conductive of electrons, and means for applying such potential to said scintillation counter.

The advantages of the present invention are preferably attained by applying a voltage of suitable potential and polarity to the first dynode of the photomultiplier tube during the period within which it is desired to establish the tube at either a conductive or non-conductive condition. In those instances wherein the scintillation counter is to be disabled upon the arrival of an incident radiation, a negative potential generated by means responsive to such arrival is applied to drive the first dynode to the same potential as that of the photo-cathode, said negative potential being applied during an interval of time generally approximating the resolving time of the cable. In those instances wherein the scintillation counter is to be cycled on and off at a predetermined frequency, the potential so applied to the first dynode is preferably that sufficient to render the tube conductive, and is applied repetitively at a predetermined frequency.

Figure 1:
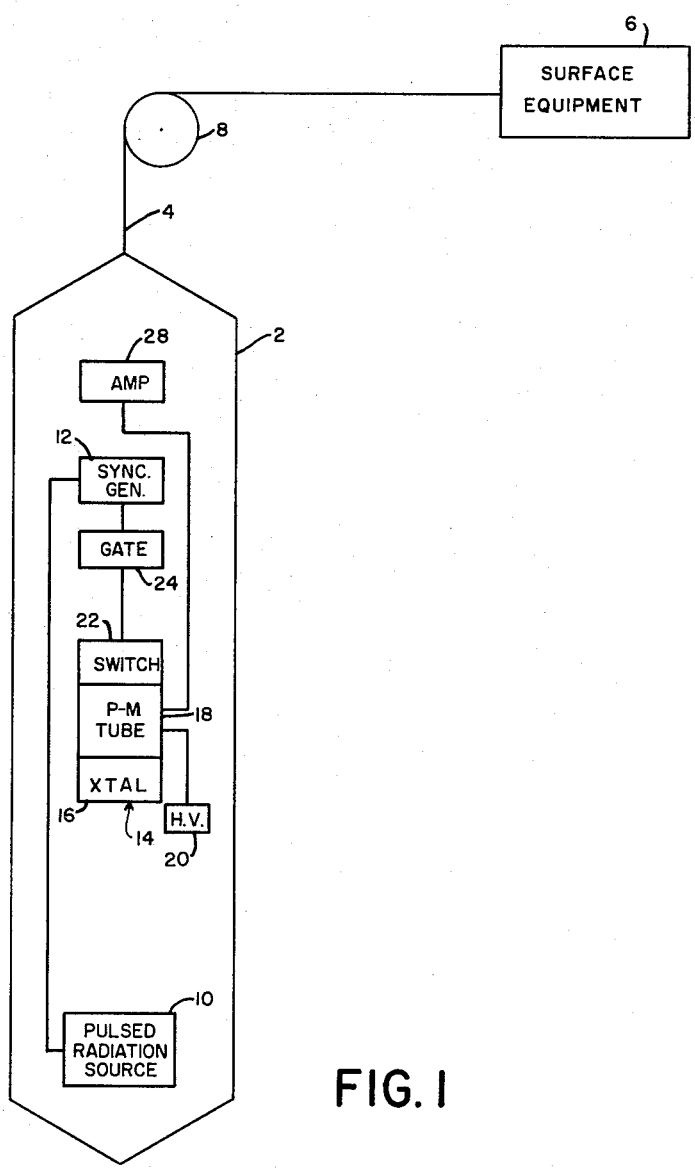
FIGURE 1 is a functional diagram of a radioactivity well logging system including a simplified representation of apparatus for switching a scintillation counter on and off in conjunction with the operation of a pulsed source of radiation.

In those forms of the invention chosen for purposes of illustration in the drawings, FIGURE 1 shows a general representation of a radioactivity well logging system including a subsurface logging instrument 2, measuring and recording equipment 6 located at the surface of the earth, and a logging cable 4 for transmitting signals from the logging instrument 2 to the measuring and recording equipment 6. The logging cable 4 provides the means for suspending the logging instrument 2 in a borehole, and may be passed over and supported by a measuring wheel 8 for obtaining an indication of the depth at which the logging instrument 2 is suspended. The measuring wheel 8 may be supported in any convenient manner, as by a traveling block supported over the mouth of the borehole by a derrick.

The logging instrument 2 may be provided with a pulsed radiation source 10 arranged and adapted to be cycled on and off by means of trigger pulses supplied by a synchronizing generator 12. The synchronizing generator 12 depicted in FIGURE 1 may be any suitable means, such as a blocking oscillator, and the pulsed source 10 may be a D-T accelerator tube as shown in U.S. Letters Patent No. 2,689,918 which issued to A. H. Youmans on September 21, 1954. Included within the logging instrument 2 is scintillation detector 14 composed of a phosphor 16 optically connected to a photomultiplier tube 18. The photomultiplier tube 18 is arranged and adapted to be continually energized by a power supply 20, which may be of any suitable type, and is interconnected with a switch 22. A suitable gating circuit 24, such as that depicted in the copending application for U.S. Letters Patent filed December 31, 1962 by Eric C. Hopkinson and Alexander B. C. Marshall, Serial No. 248,569, now abandoned, may be used to actuate the switch 22 in response to the action of the synchronizing generator 12. The output of the photomultiplier tube 18 is shown applied to a conventional amplifier circuit 28 for amplification before being sent to the surface by way of the cable 4.

Figure 2:
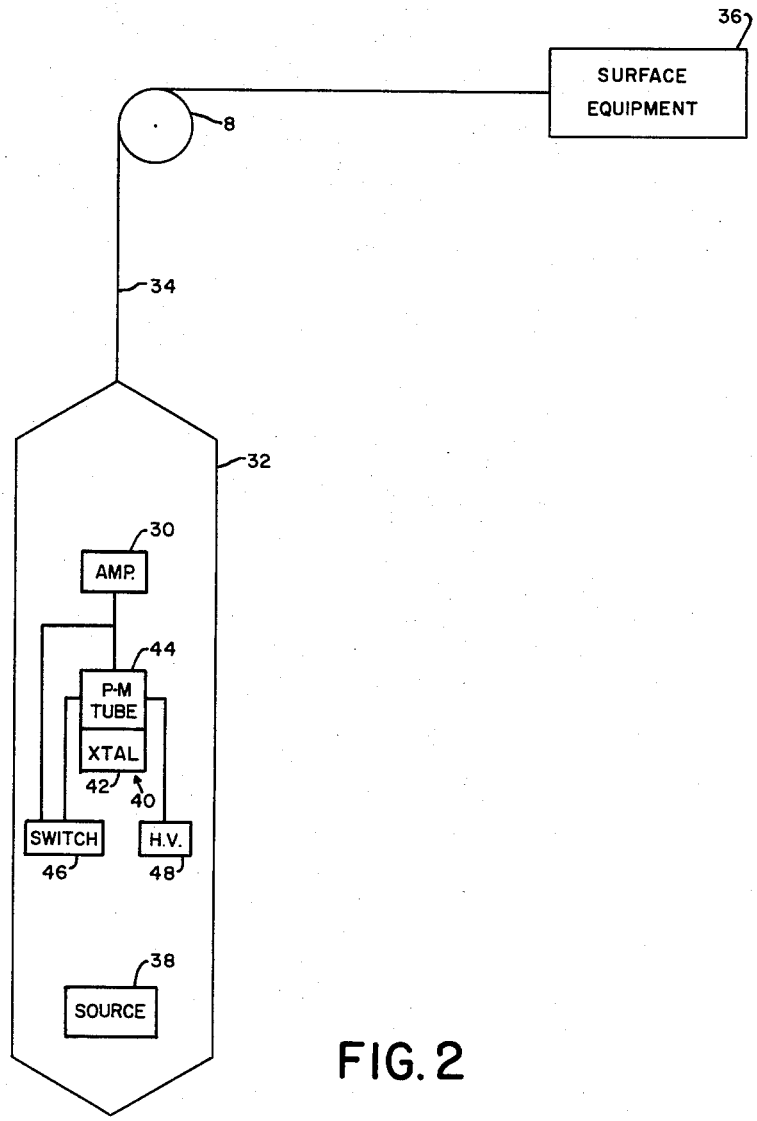
FIGURE 2 is a functional diagram of a different radioactivity well logging system including a simplified representation of apparatus for disabling a scintillation counter during the resolving time of the logging cable.

Referring now to FIGURE 2, there may be seen a different radioactivity well logging system composed of a subsurface logging instrument 32 connected to suitable measuring and recording equipment 36 by means of a cable 34. The logging instrument 32 may contain a radiation source 38 of any suitable kind, and preferably includes a radiation detector 40 comprised of a scintillation phosphor 42 and a photomultiplier tube 44. As shown in FIGURE 2, the photomultiplier tube 44 is powered by a suitable high voltage supply 48 as depicted in FIGURE 1. The output of the photomultiplier tube 44 is applied to a conventional amplifier 30, and also to a switch 46. As will hereinafter be explained in detail, the switch 46 is arranged and adapted to respond to the first arrival of a radiation striking the crystal 42 by immediately rendering the photomultiplier tube 44 non-conductive for a predetermined time interval. Thereafter, the switch 46 restores the photomultiplier tube 44 to its normal conductive state.

Figure 3:
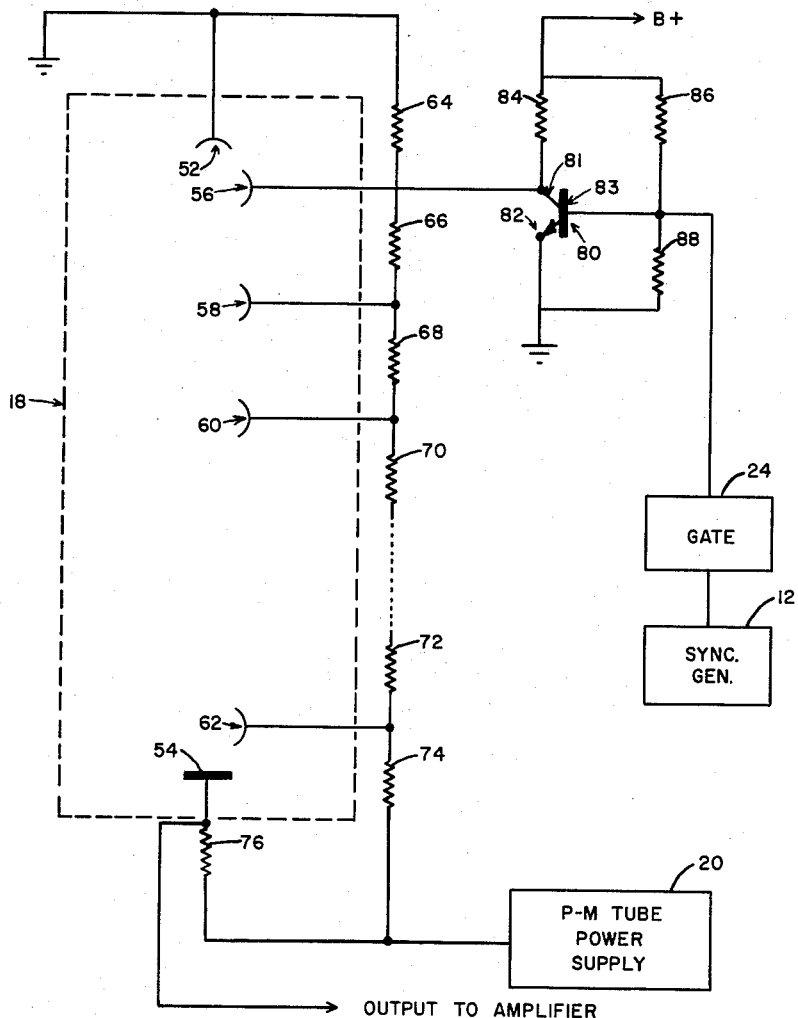
FIGURE 3 is a detailed representation of the switching apparatus generally depicted in FIGURE 1.

Referring now to FIGURE 3, there may be seen a diagrammatic representation of the circuitry included within the photomultiplier tube 18 and switch 26 depicted in FIGURE 1. In FIGURE 3, the photomultiplier tube 18, which is shown energized by the power supply 20, is represented by the various components included within the heavy dashed line, and specifically include a grounded photo-sensitive cathode 52 which is arranged and adapted to "see" light pulses, or scintillations, occurring in the phosphor 16 as a result of incident radiations, and to respond to such scintillations by emitting electrons in magnitude relative to the brilliance of such scintillations. Also within the photomultiplier tube 18 are a plurality of dynodes 58–62 (usually ten or more), and an anode 54 or "plate." The various dynodes (except the first dynode 56) are connected to load resistors 64–74 for the purpose of establishing each such dynode at a successively higher potential than that of the previous dynode. For example, resistor 68 establishes dynode 60 at a predetermined potential (usually about 100 volts) higher than that at which dynode 58 is maintained, and dynode 62 is established by resistor 72 at a predetermined potential higher than that of the preceding dynode (suggested but not depicted in FIGURE 3). Resistor 74, of course, establishes the anode 54 at the highest potential. Thus, the electrons emitted by the photocathode 52 in response to a scintillation in the phosphor 16 (see FIGURE 1) are accelerated to the first dynode 56, if that element of the photomultiplier tube 18 is held at a higher potential than the grounded photocathode 52. Due to its inherent nature, the first dynode 56 responds to the electrons from the photocathode 52 by emitting a greater number of electrons which, in turn, are accelerated to the second dynode 58. The process is then repeated with respect to the third dynode 60, and so on through the photomultiplier tube 18, until a proportionally large number of electrons is received at the anode 54 from the last dynode 62. The electrons received at the anode 54 create a surge or "pulse" of current through the load resistor 76, and this pulse is applied to the amplifier 28 shown in FIGURE 1.

However, it may be seen in FIGURE 3 that the first dynode 56 is not connected to any of the resistors 64–74, but is connected, rather, to the collector 81 of a transistor 80 which has its emitter 82 connected to ground and its base 83 connected to the gate 24 depicted in FIGURE 1. The gate 24 may be any suitable means for generating a negative output in response to a signal from the synchronizing generator 12. The collector 81 is further connected to a positive voltage source "B+" by way of load resistor 84. The base 83 is also connected to B+ by way of a bias resistor 86, and to ground by way of another bias resistor 88. As depicted in FIGURE 3, the first dynode 56 will be established at the same potential as that of the collector 81.

Thus, when current flows across the transistor 80, the potential of collector 81 will be established at approximately ground potential, and thus the first dynode 56 will be driven to approximately the same potential as that of the grounded photocathode 52. In such a condition, the photomultiplier tube 18 will not produce an output signal irrespective of any scintillations in the phosphor 16, since electrons will not flow from the photocathode 52 to the first dynode 56. However if a negative voltage is applied by the gate 24 to the base 83 of the transistor 80, then current flow across the transistor 80 will be interrupted, the collector 81 will go to a much higher potential (B+) than that of the emitter 82, and the first dynode 56 will be established at a potential much higher than that of the photocathode 52. Electrons produced by the photocathode 52 will then flow to the first dynode 56 which, in turn, will emit a proportionally greater number of secondary electrons. Upon termination of the negative output by the gate 24, the former condition will become re-established and the photomultiplier tube 18 will again become non-conductive. Thus it may be seen that, in that form of the present invention represented in FIGURES 1 and 3, a very useful means and method is provided for rendering a scintillation counter 14 instantly responsive or unresponsive to incident radiations, depending upon the condition desired, and since the photomultiplier tube 18 remains energized at all times by the tube power supply 20, practically no time at all is required for each change of condition. Thus, those radioactivity well logging systems providing measurements by means of pulsed radiation source and detector outputs are greatly improved by the utilization of the present invention.

Figure 4:
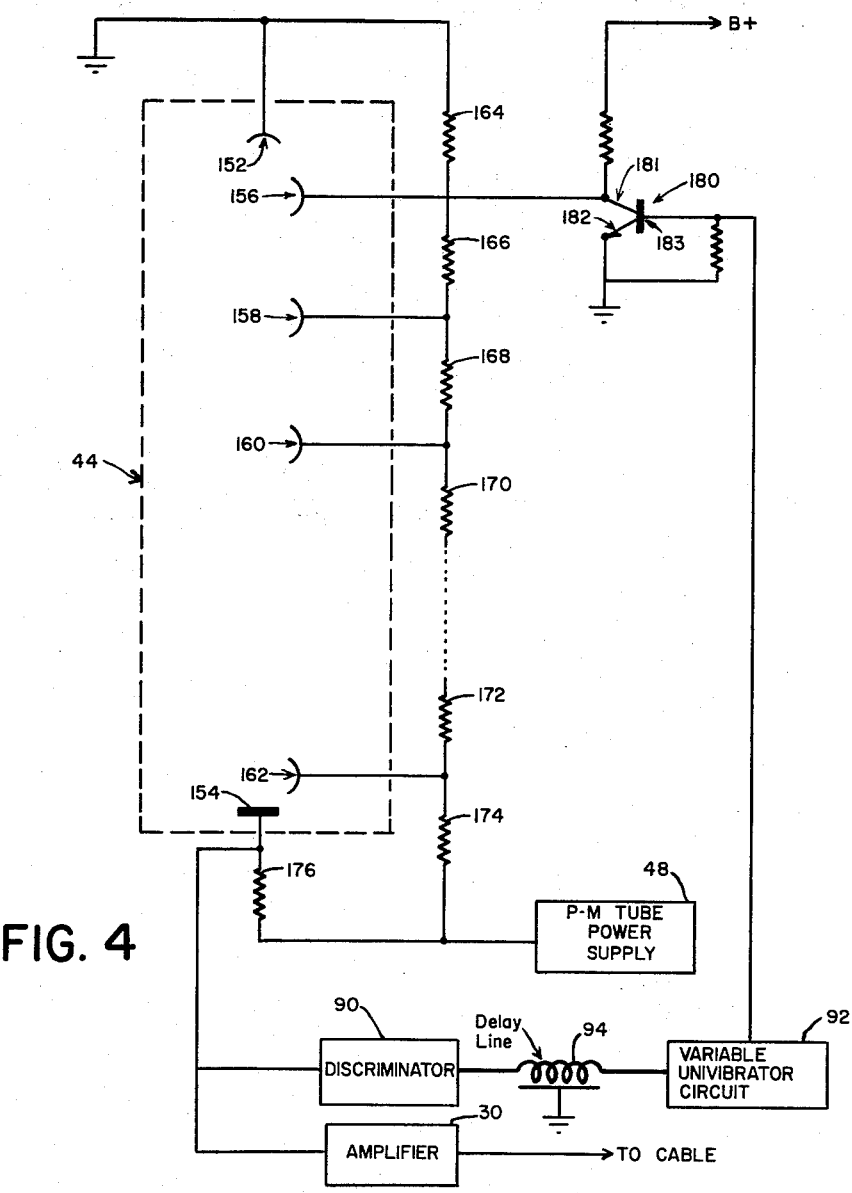
FIGURE 4 is a detailed representation of the disabling apparatus generally depicted in FIGURE 2.

Referring now to FIGURE 4, there may be seen a diagrammatic representation of the details of portions of the circuitry included within the logging instrument 32 depicted in FIGURE 2. In particular, the photomultiplier tube 44 is represented by the heavy dashed line, and includes a photocathode 152, a plurality of dynodes 156–162, and an anode 154, as hereinbefore described for the photomultiplier tube 18 depicted in FIGURE 3. Similarly, various load resistors 164–176 are depicted as performing functions similar to those of the load resistors 64–76 depicted in FIGURE 3. It may be seen that when the photocathode 152 "sees" a scintillation in the phosphor 42 depicted in FIGURE 2, a pulse of current will flow in the circuit connecting the anode 154 to the discriminator 90 and the amplifier 30, if the transistor 180 is not conducting. The output pulse received by the discriminator 90 is passed to a variable univibrator circuit 92 of standard design, by way of a delay line 94 of some suitable type. The univibrator circuit 92 may be arranged and adapted to provide a positive output, for a predetermined period, to the base 183 of the transistor 180. In this event, the transistor 180 is rendered conductive for the duration of the output of the variable univibrator circuit 92, and the photomultiplier tube 44 is correspondingly "paralyzed" (rendered non-conductive) during such period. When the univibrator circuit 92 returns to its normal state, the transistor 180 returns to its non-conductive state. In such event, the photomultiplier tube 44 again becomes capable of responding to scintillations in the phosphor 42.

The advantage of the form of the present invention depicted in FIGURES 3 and 4, is that the photomultiplier tube 44 is caused to change condition almost instantaneously. If the delay line 94 is chosen to delay the transfer of the pulse to the variable univibrator circuit 92 just long enough to allow the first arrival of the incident radiation to be registered, and if the variable univibrator circuit 92 provides an output to paralyze the photomultiplier tube 44 for a period approximating the resolving time of the cable 34 (see FIGURE 2), then only the first arrival of such incident radiation will be represented in the output of the photomultiplier tube 44.

Paralysis by means of the present invention can be initiated at other points in scintillation counter circuitry, than at the first dynode of a photomultiplier tube. However, the high speed of response provided by those forms of the present invention depicted in the accompanying drawings is a distinct advantage in making radioactivity well logging measurements. Moreover, where the photomultiplier tube is disabled from time-to-time, the fatigue effects are substantially reduced in respect to the operation of the tube.

Numerous other variations and modifications may obviously be made without departing from the present invention. Accordingly, it should be clearly understood that those forms of the invention hereinbefore described, and shown in the figures of the accompanying drawings, are illustrative only and are not intended to limit the scope of the invention.

What is claimed is:
1. In a radiation detection system including in combination
   a phosphor arranged and adapted to produce a scintillation in response to substantially each incident radiation of suitable character;
   a normally conducting photomultiplier tube having a photocathode arranged to emit separate pulses of primary electrons in response to separately occurring scintillations,
   at least one dynode arranged at a first potential relative to said photocathode to accelerate said primary electrons and in response thereto to emit secondary electrons, and
   an anode arranged to develop a first pulse of electric current functionally related to said secondary electrons; and
   means including a cable connected between said anode and a point remote from said system for conducting said first pulse of electric current to said remote point;
   the improvement in combination therewith comprising delay means connected to said anode and adapted to derive after a first preselected time period a second current pulse in response to said first current pulse, and
   switch means arranged and adapted to receive said delayed second current pulse and in response thereto to apply a second potential to said dynode during a second preselected time interval,
   said second potential being opposite in polarity to said first potential and of a magnitude substantially equal to that of said first potential to render said tube non-conductive during said second interval.
2. The apparatus in claim 1, wherein said switch means applies said second potential to said dynode during a second time interval substantially equal to the difference between the resolving time of said cable and said first preselected time interval.
3. In a radioactivity well logging system including
   a pulse generator arranged and adapted to provide trigger pulses at a predetermined rate,
   an accelerator tube including pulsing means responsive to said trigger pulses,
   a phosphor, and
   a photomultiplier tube optically connected to said phosphor and including a photocathode, at least one dynode, and an anode;
   the improvement in combination therewith comprising gating and switching means including means responsive to said trigger pulses for applying a potential on said dynode during a predetermined interval commencing a predetermined time after the occasion of each of said trigger pulses.
4. In a radioactivity well logging system including
   a pulse generator arranged and adapted to provide trigger pulses at a predetermined rate,
   an accelerator tube including pulsing means responsive to said trigger pulses, and
   a radiation detector including a phosphor and a photomultiplier tube,
   the improvement in combination therewith comprising gating and switching means arranged and adapted to cause said photomultiplier tube to become conductive for a predetermined time interval in response to each of said trigger pulses.

References Cited by the Examiner
UNITED STATES PATENTS 2,911,535 11/1959 Muench _____ 250—71.5
2,991,364 7/1961 Goodman _____ 250—71.5 X
3,102,954 9/1963 Richardson et al. ____ 250—71.5

RALPH G. NILSON, *Primary Examiner.*

ARCHIE R. BORCHELT, *Examiner.*